(12) United States Patent
Fisher

(10) Patent No.: US 9,919,784 B1
(45) Date of Patent: Mar. 20, 2018

(54) ELECTRICAL WATERCRAFT PROPULSION SYSTEM

(71) Applicant: Harry M. Fisher, Richmond, VA (US)

(72) Inventor: Harry M. Fisher, Richmond, VA (US)

( * ) Notice: Subject to any disclaimer, the term of this patent is extended or adjusted under 35 U.S.C. 154(b) by 9 days.

(21) Appl. No.: 14/492,523

(22) Filed: Sep. 22, 2014

Related U.S. Application Data

(60) Provisional application No. 61/880,369, filed on Sep. 20, 2013.

(51) Int. Cl.
*B63H 21/17* (2006.01)
*B63H 5/07* (2006.01)
*B63H 1/14* (2006.01)
*B63H 23/06* (2006.01)
*H02J 7/35* (2006.01)
*H02J 7/02* (2016.01)
*H02J 7/00* (2006.01)

(52) U.S. Cl.
CPC ............... *B63H 21/17* (2013.01); *B63H 1/14* (2013.01); *B63H 5/07* (2013.01); *B63H 23/06* (2013.01); *H02J 7/0055* (2013.01); *H02J 7/02* (2013.01); *H02J 7/35* (2013.01); *B63H 2021/171* (2013.01)

(58) Field of Classification Search
CPC .. B63H 2021/171; B63H 21/17; B63H 23/24; B63H 2021/202; B63H 21/20; B63H 2005/1258; B60L 11/1812; B60L 11/1816; B60L 8/003; H02J 7/0052; H02J 7/0055
USPC .......... 361/601, 622, 679, 728; 320/101, 104
See application file for complete search history.

(56) References Cited

U.S. PATENT DOCUMENTS

| | | | |
|---|---|---|---|
| 6,645,022 B2 | 11/2003 | Tsubouchi et al. | |
| 6,855,016 B1* | 2/2005 | Jansen | ............... 440/6 |
| 7,898,212 B2* | 3/2011 | Benn et al. | .............. 320/101 |
| 7,905,307 B2* | 3/2011 | Kubota et al. | ............. 180/68.1 |
| 8,298,023 B2 | 10/2012 | Daikoku | |
| 8,328,590 B2 | 12/2012 | Inaba et al. | |
| 9,028,285 B2* | 5/2015 | Tamba | ............... 440/3 |
| 2013/0045648 A1 | 2/2013 | Kinpara et al. | |
| 2015/0239546 A1* | 8/2015 | Limseth | ........... B63H 23/24 440/6 |

FOREIGN PATENT DOCUMENTS

| | | |
|---|---|---|
| EP | 1081041 A2 | 3/2001 |
| FR | 2781755 A1 * | 2/2000 |

* cited by examiner

*Primary Examiner* — Andrew Polay
(74) *Attorney, Agent, or Firm* — Robert C. Montgomery; Montgomery Patent & Design

(57) ABSTRACT

An electric watercraft propulsion system includes a battery assembly capable of generating AC power, an electric motor electrically connected to the battery assembly, and an output drive shaft mechanically connected to the electric motor.

9 Claims, 5 Drawing Sheets

ELECTRICAL WATERCRAFT PROPULSION SYSTEM

RELATED APPLICATIONS

The present invention was first described in and claims the benefit of U.S. Provisional Application No. 61/880,369 filed Sep. 20, 2013 the entire disclosures of which are incorporated herein by reference.

FIELD OF THE INVENTION

The present invention relates generally to watercraft propulsion and, more particularly, to an electric watercraft propulsion system utilizing a DC battery assembly, a DC to AC inverter, and an AC motor to exploit the efficiencies of AC motors while using a DC electrical power supply.

BACKGROUND OF THE INVENTION

Propeller-type engines are perhaps the most common method of propelling a watercraft. Their design is readily adaptable from the smallest dinghy to the largest cargo vessel. They are easy to maintain, work in almost all environments, and can be driven by almost any type of prime mover from pedal power to a nuclear reactor.

However, other than a trolling motor, electrical power is seldom utilized. This is due to the fact that the DC voltage produced by on-board batteries requires large, heavy, and somewhat inefficient motors to utilize. While AC motors, particularly those at a higher frequency, are more efficient, they are currently not practical for use in a maritime environment.

Accordingly, there exists a need for a means by which high frequency AC motors and their improved efficiencies can be used to propel outboard engines.

SUMMARY OF THE INVENTION

The inventor has recognized the aforementioned inherent problems and lack in the art and observed that there is a need for an electric watercraft propulsion system. The development of the present invention, which will be described in greater detail herein, substantially departs from conventional solutions to fulfill this need.

In one (1) embodiment, the disclosed electric watercraft propulsion system includes a battery assembly capable of generating AC power, an electric motor electrically connected to the battery assembly, and an output drive shaft mechanically connected to the electric motor.

In another embodiment, the disclosed watercraft includes a watercraft frame including a floor and a roof, an electric motor mechanically connected to the watercraft frame, an output drive shaft mechanically connected to the electric motor, a solar panel coupled to the roof of the watercraft frame, a waterproof electrical equipment enclosure connected to the floor of the watercraft frame, a plurality of rechargeable batteries electrically interconnected in at least one of series or parallel capable of supplying DC power, the plurality of rechargeable batteries being housed within the waterproof electrical equipment, a battery charger housed within the waterproof electrical equipment enclosure and electrically interconnected between the solar panel and the plurality of batteries, and an inverter housed within the waterproof electrical equipment enclosure and electrically interconnected between the plurality of batteries and the electric motor, the inverter being capable of converting the DC power to AC power.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
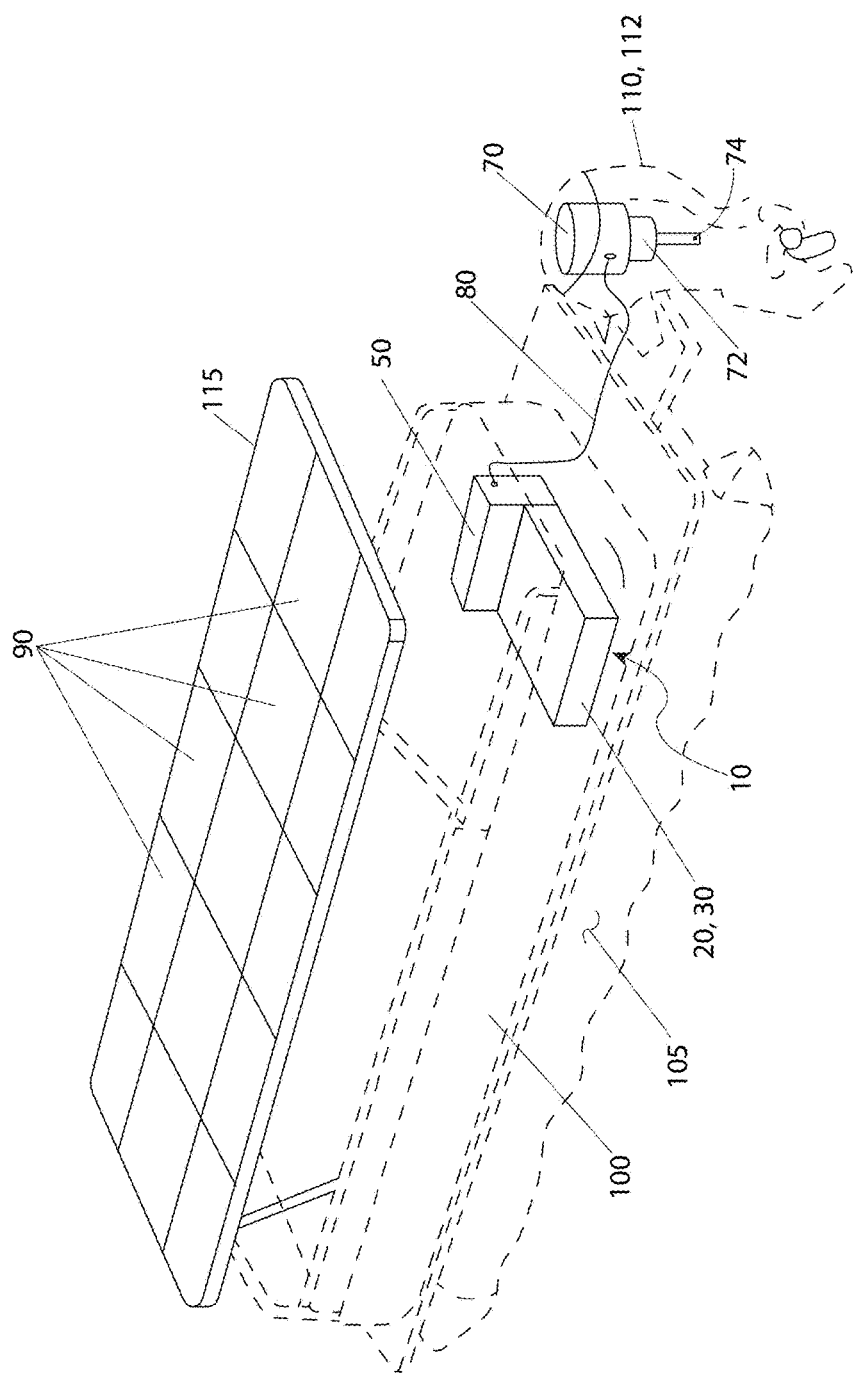
FIG. 1 is an environmental view of one (1) embodiment of the disclosed electric watercraft propulsion system.

DESCRIPTIVE KEY 10 electric watercraft propulsion system
20 battery assembly
22 battery
24 battery terminal
26 battery wiring
30 battery case lid
31 lid lip
32 battery case base
33 base lip
34 terminal clearance feature
36 divider
38 clip
39 tightening bolt
40 mounting bracket
42 fastener
44 gasket
50 electrical equipment enclosure
52a first connector
52b second connector
52c receptacle
54 battery charger
56 fuse/breaker
58 inverter
60 motor control module
62 speed control mechanism
70 motor
72 gear reducer
74 output shaft
80 motor wiring
90 solar panel 100 watercraft
105 pontoon
110 motor housing
112 conventional internal combustion engine
115 roof structure

DETAILED DESCRIPTION OF THE PREFERRED EMBODIMENT

In accordance with the invention, the best mode is presented in terms of a one or more of the disclosed embodiments, herein depicted within FIGS. 1 through 4c. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring to FIGS. 1-4c, disclosing an electric watercraft propulsion system (herein described as the "system") 10, where like reference numerals represent similar or like parts. Generally, the disclosed system 10 includes a means to propel a marine watercraft 100 by utilizing a DC battery assembly 20, a DC to AC inverter 58, and an AC motor 70.

Referring now to FIG. 1, an environmental view of the system 10, according to the one (1) embodiment of the present invention, is disclosed. The system 10 provides a means to propel the watercraft 100 by utilizing the DC battery assembly 20, a plurality of electrical components stored within an electrical equipment enclosure 50, and the AC motor 70. The system 10 is powered by an electrical power source rather than a conventional fossil fuel powered engine. One (1) example embodiment, as illustrated in FIG. 1, the system 10 is installed upon a pontoon boat type (i.e., the watercraft 100); however, it is understood that the system 10 may be installed upon other watercraft 100, preferably having a large footprint, such as a house boat type, with equal benefit, and as such should not be interpreted as a limitation of scope.

Figure 2:
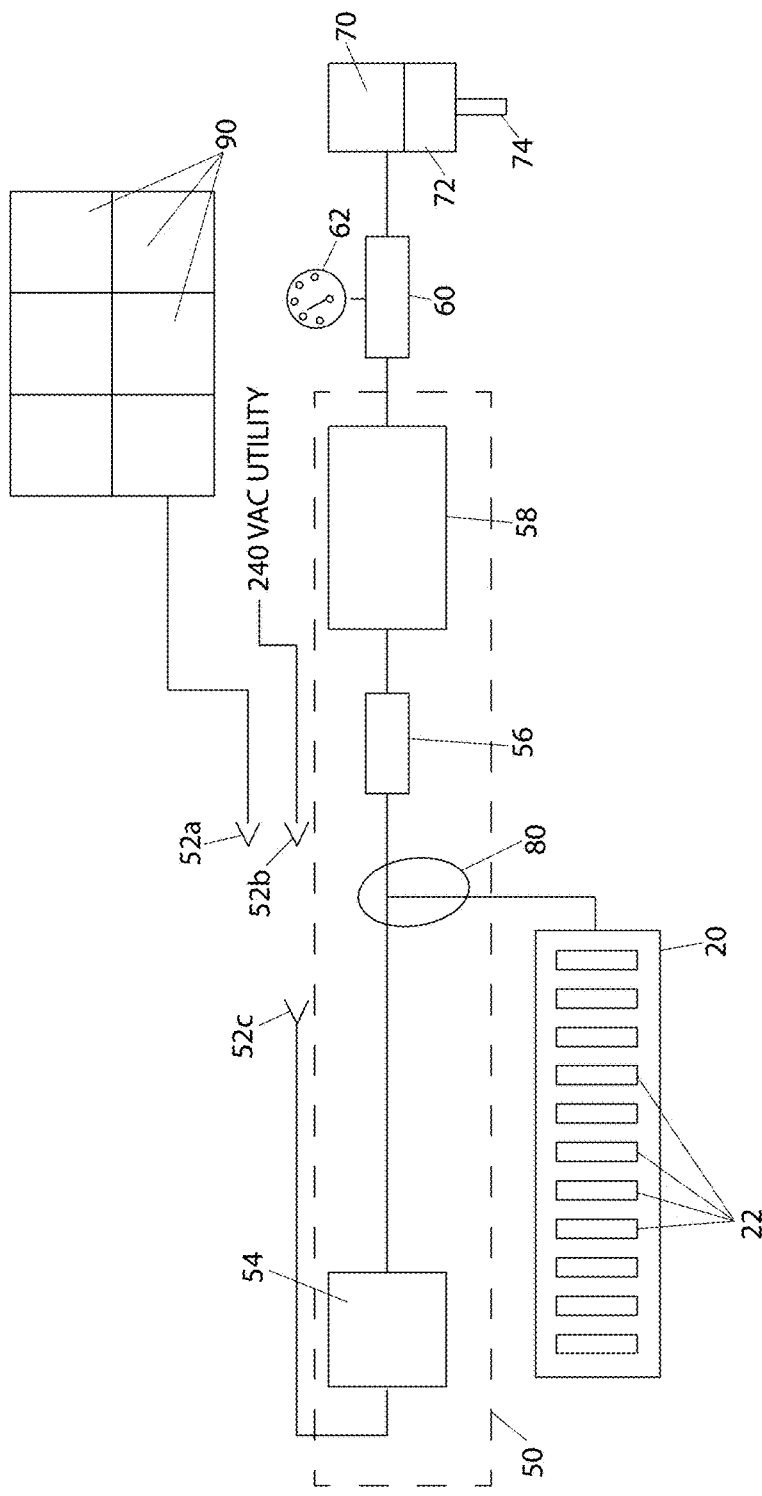
FIG. 2 is an electrical block diagram of the electric watercraft propulsion system.
Figure 3A:
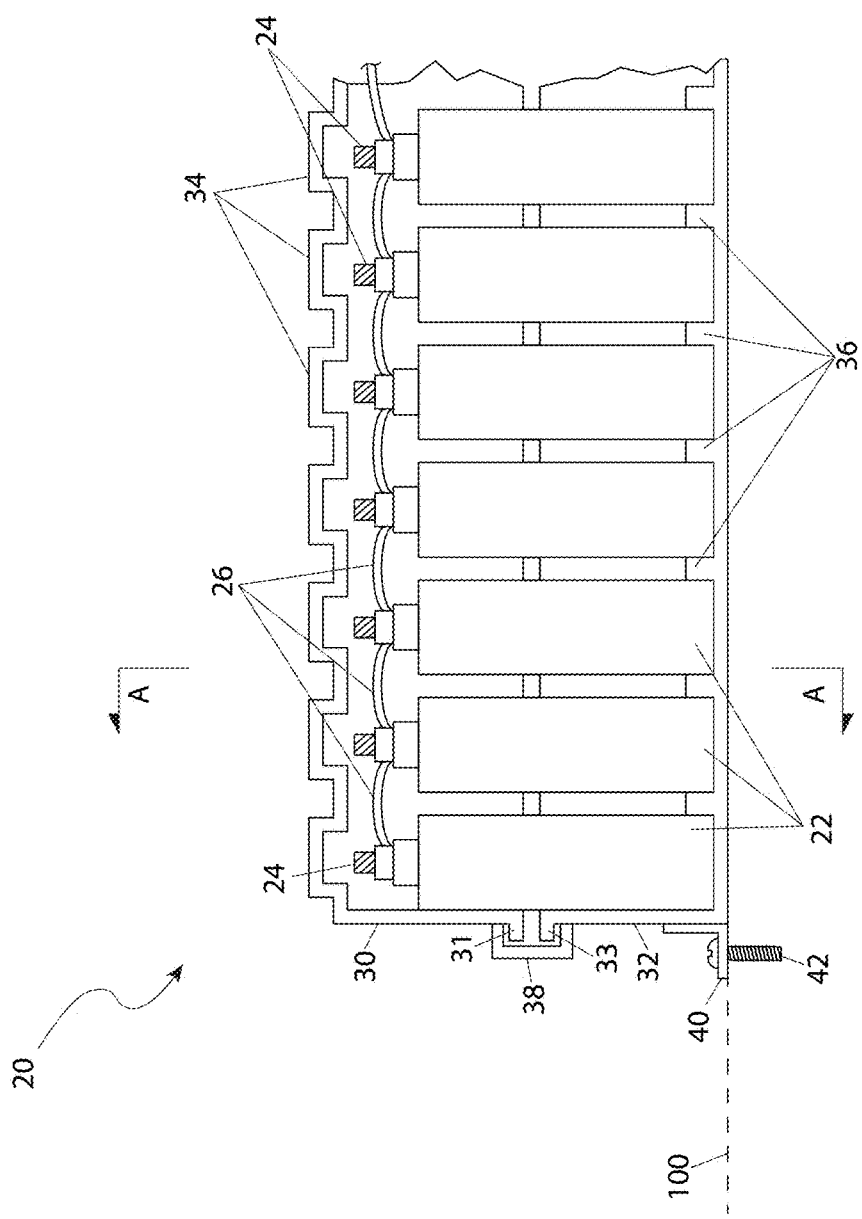
FIG. 3a is a sectional view of one (1) embodiment of a battery assembly of the disclosed electric watercraft propulsion system.
Figure 3B:
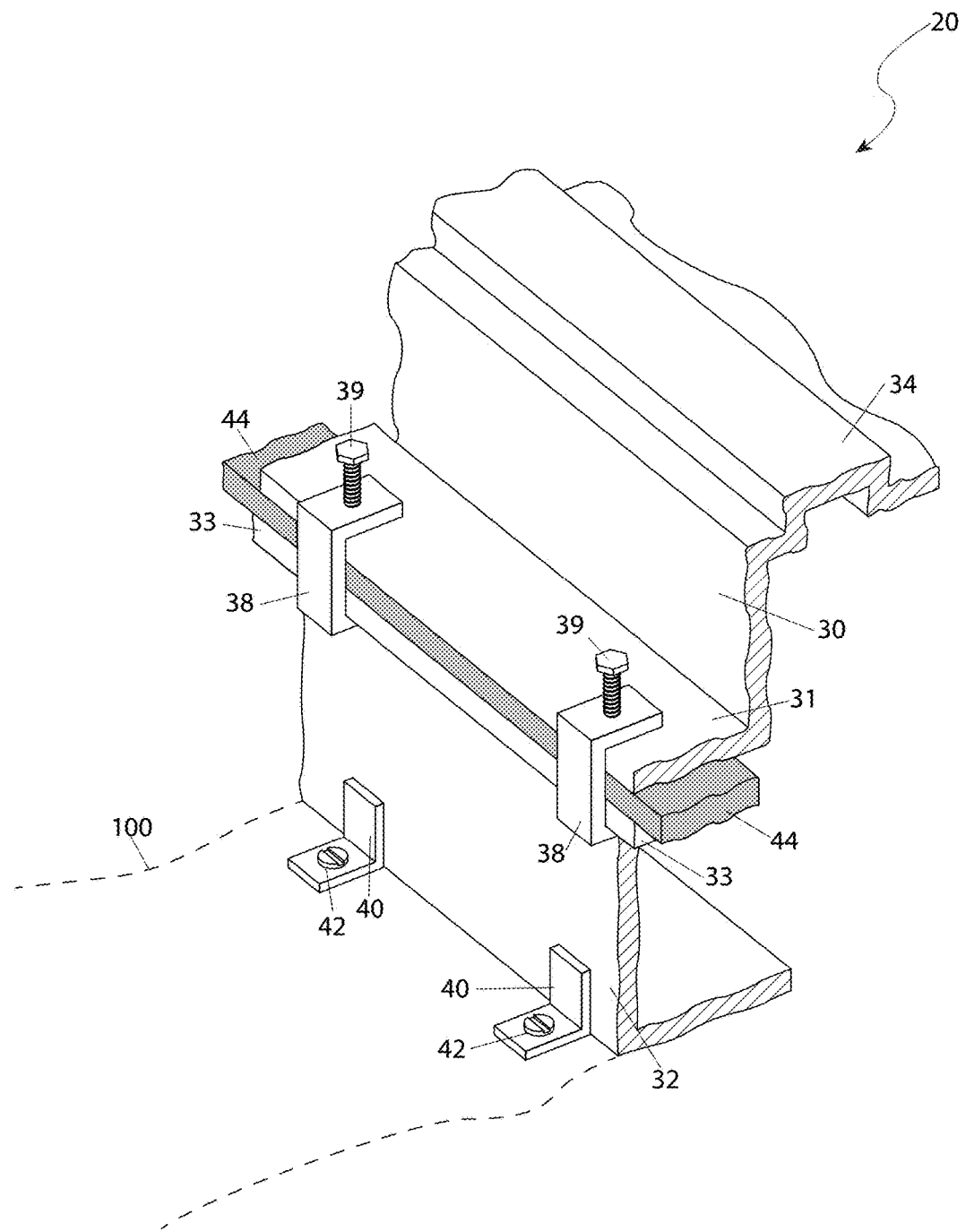
FIG. 3b is a close-up view of the battery assembly.
Figure 4A:
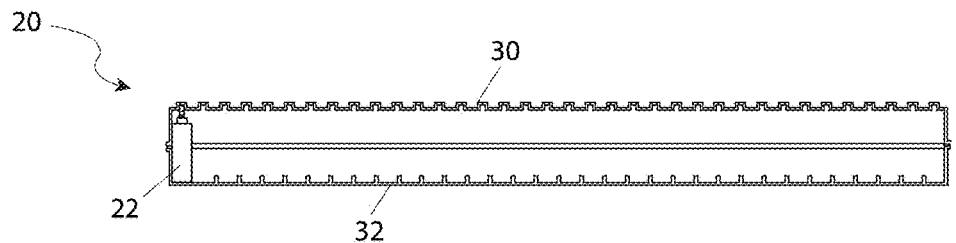
FIG. 4a is a sectional view of the battery assembly taken along section line A-A of FIG. 3.
Figure 4B:
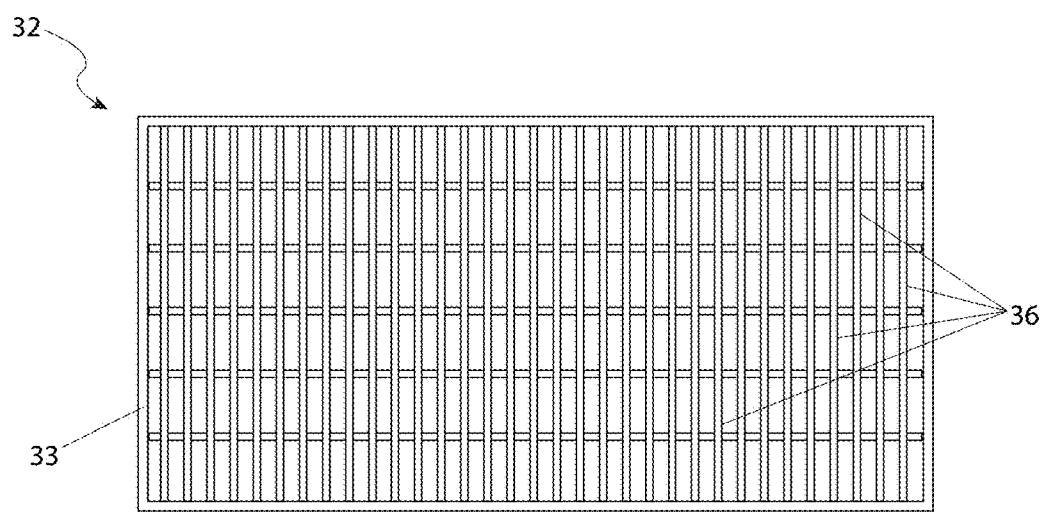
FIG. 4b is a top view of one (1) embodiment of a base of the battery assembly; and, FIG. 4c is a top view of one (1) embodiment of a lid of the battery assembly.
Figure 4C:
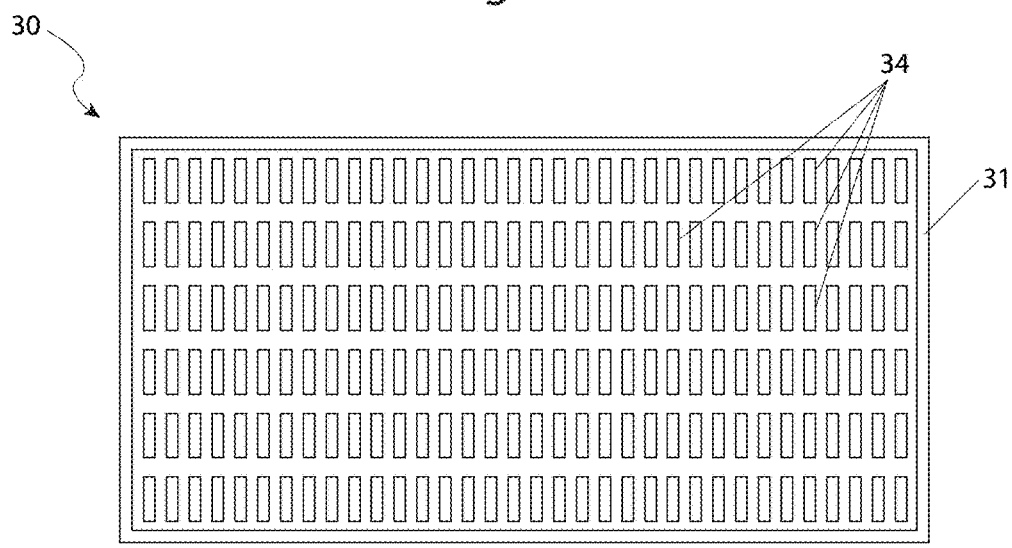

The battery assembly 20 is envisioned to be installed upon or within a floor section of the watercraft 100, preferably adjacent to navigation and/or motor 70 of the watercraft 100 to reduce electrical wiring lengths 80 between the major portions of the system 10. The electrical equipment enclosure 50 may be a part of, or separate from, the battery assembly 20 and contains various electrical components necessary to provide power to the motor 70 such as, but not limited to: a battery charger 54, a fuse/breaker 56, the DC to AC inverter 58, a control module 60, and an AC speed control mechanism 62 (FIG. 2).

The electrical AC motor 70 is envisioned to be integrated into a motor housing 110 of a conventional internal combustion engine 112, thereby utilizing portions of the conventional internal combustion engine 112, such as a steering mechanism, a drive shaft, and a propeller mechanism, while providing a similar appearance.

The battery assembly 20 is envisioned to provide multiple means of being recharged, including an array of photovoltaic solar panels 90 mounted to a roof structure 115 of the watercraft 100, as illustrated in FIG. 1, or by utilizing available home or dock power sources.

The system 10 is envisioned to be capable of being installed onto an existing watercraft 100 or may be incorporated into original designs of new watercraft 100.

Referring now to FIG. 2, an electrical block diagram of the system 10, according to one embodiment of the present invention, is disclosed. The battery assembly 20 protectively contains a plurality of commercially-available rechargeable batteries 22 (FIGS. 3, 4a, 4b, 4c), which provide amperage to power the AC gear-reduction motor 70.

The DC voltage from the batteries 22 is supplied to the DC to AC inverter 58 to produce AC power, preferably being three-phase and four hundred Hertz (400 Hz) frequency. The output power is controlled and delivered to the AC motor 70 by the control module 60 including a user-selectable speed control mechanism 62. An in-line replaceable fuse 56 is provided to protect electrical portions of the system 10 in an event of shorting or component failure. The speed control mechanism 62 is envisioned to include a conventional variable AC motor control unit preferably including a user interface, such as a lever-type handle, so as to emulate a conventional mechanical speed control mechanism.

The motor 70 is preferably a 3-phase, four hundred Hertz (400 Hz), 4-pole, induction motor capable of producing approximately twenty kilowatts (20 kW) of power. The motor 70 includes a mechanical output shaft 74 capable of rotating at approximately twelve thousand revolutions per minute (12000 RPM), which is then reduced via an integral gear reducer 72, to produce a desired torque as well as a desired range of speeds of the watercraft 100. However, it is understood that motors 70 having various power ratings may be utilized based upon a size of the watercraft 100, performance specifications, and a user's preference.

The user-selectable speed control mechanism 62 is to be capable of delivering a motor speed that may vary between zero and twelve thousand revolutions per minute (0-12,000 RPM's). These features allow use of a more efficient AC motor 70, which operates at a high frequency to reduce size and weight, while increasing output power.

The electrical equipment enclosure 50 contains a first connector 52a, a second connector 52a, and a corresponding receptacle 52c to facilitate the charging of the batteries 22. The first connector 52a connects an array of solar panels 90 to the receptacle 52c of the system 10 to recharge the batteries 22 via the battery charger 54. The second connector 52b may be used to connect a home-based or dock-side electrical hook-up to the receptacle 52c of the system 10 to charge the batteries 22. It is further understood that the electrical equipment enclosure 50 contains additional equipment to enable automatic switching of power from the solar panels 90 to the dock-side electrical hook-up and as such should not be interpreted as a limiting factor of the system 10.

Referring now to FIGS. 3a, 3b, 4a, 4b, and 4c, a sectional view of a battery assembly 20 and top views of respective battery case lid 30 and battery case base 32, according to one embodiment of the present invention, are disclosed. The battery assembly 20 protectively contains a plurality of commercially-available rechargeable batteries 22, such as those manufactured by C&D TECHNOLOGIES®, preferably using lithium, NiCad, ion, or other current battery technologies. The batteries 22 are envisioned being wired together in a serial and parallel manner to produce an output voltage of approximately 300 volts DC and providing sufficient amperage to power the AC gear-reduction motor 70. The battery assembly 20 is envisioned being mounted to floor portions of the watercraft 100 using a plurality of brackets 40 and associated fasteners 42 (FIG. FIG. 3a).

The battery assembly 20 provides a rectangular, water-resistant structure including the battery case lid 30 and the battery case base 32. The battery case lid 30 and battery case base 32 define a rectangular, two-piece box structure. The lid 30 and base 32 are envisioned being made using water-resistant plastic materials, such as fiberglass, PVC, or the like, envisioned being mounted to floor portions of the water craft 100 using a plurality of equally-spaced "L"-shaped brackets 40 and associated fasteners 42, such as screws or bolts.

A lid lip 31 and base lip 33 are to be separated by a rubber gasket 44 all around a perimeter edge to provide sufficient waterproofing of the battery assembly 20. The gasket 44 is envisioned to have a rectangular cross-sectional shape. The lid lip 31 and base lip 33, along with the included gasket 44, are secured in a slightly compressed manner using a plurality of equally-spaced "C"-shaped clips 38 arranged all around the battery assembly 20. Each clip 38 further includes a tightening bolt 39 along a top surface. By rotating the tightening bolts 39, the lid lip 31, base lip 33, and gasket 44 are clamped together in a waterproof manner.

The lid 30 includes a plurality of battery terminal clearance features 34, which provide top clearance for battery terminals 24 and interconnecting battery wiring 26. The base 32 includes a matrix of integral divider portions along a bottom surface to help position, stabilize, and separate the batteries 22.

Those skilled in the art will recognize that other styles and configurations of the disclosed system 10 can be easily incorporated into the teachings of the present disclosure, and only particular configurations have been shown and described for purposes of clarity and disclosure and not by way of limitation of scope.

The example embodiments of the present invention can be utilized by the common user in a simple and effortless manner with little or no training. After initial purchase or acquisition of the system 10, it would be installed as indicated in FIG. 1.

One (1) embodiment of the disclosed method for utilizing the system 10 may be include a series of steps, including: 1). procuring a model of the system 10 being correspondingly sized and configured for an intended watercraft 100; 2). attaching the battery case base 32 of the battery assembly 20 to a floor portion of an existing water craft 100 using the mounting brackets 40 and fasteners 42; 3). loading the batteries 22 into the battery case base 32; 4). wiring the batteries 22 together; 5). installing the gasket 44 and battery case lid 30 onto the battery case base 32; 6). securing the battery case lid 30 to the battery case base 32 in a waterproof manner by rotating the tightening bolts 39 of each clip 38 until tight; 7). integrating the electrical equipment portions of the electrical equipment enclosure 50 into the existing systems of the water craft 100; 8). installing the motor housing 110 containing the integrated AC induction motor 70 and gear reducer 72 onto the watercraft 100; 9). installing motor wiring 80 between the motor 70 and electrical components within the electrical equipment enclosure 50 using motor wiring 80 of an appropriate gauge; 10). charging the batteries 22 either by exposing the array of photovoltaic solar panels 90 to sunlight for a period of time, or by utilizing available home or dock power sources; and 11). utilizing the existing control system of the water craft 100 to pilot the craft 100 in a normal manner.

Accordingly, the disclosed system 10 provides the benefit of reduced noise and pollution associated with gasoline craft propulsion systems.

The batteries 22 may be charged either by utilizing current from the solar panels 90 using the first connector 52a, or alternately by utilizing an electrical power source such as a home-based or dock-side plug-in receptacle using the second connector 52b.

The solar panels 90 would provide sufficient surface area that corresponds to the shape and size of the watercraft 100. The solar panels 90 would be mounted to an existing roof structure 115 of the watercraft 100 using associated hardware based upon particular features of the watercraft 100, and being wired to the battery charger 54 within the electrical equipment enclosure 50 of the system 10.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An electric watercraft propulsion system comprising:
   at least one solar panel configured to generate a source DC power;
   a plurality of rechargeable batteries, each configured to store a charging DC power and deliver a supply of approximately 300 volts DC power;
   a DC power output connector electrically connected to said solar panel;
   an AC power output connector configured to be electrically connected to an AC electrical utility that supplies a source AC power;
   a power input receptacle configured to be mechanically and electrically connected to a selected one of said DC power output connector and said AC power output connector;
   a battery charger electrically connected to each rechargeable battery, wherein said battery charger is configured to receive said source AC power from said AC electrical utility and said source DC power from said solar panel, and wherein said battery charger is further configured to automatically switch between said source AC power from said AC electrical utility or said source DC power from said solar panel and deliver said charging DC power to each rechargeable battery;
   an inverter electrically connected to each rechargeable battery to receive said supply DC power from each rechargeable battery and convert said supply DC power to a supply AC power;
   a replaceable fuse electrically interconnected between each rechargeable battery and said inverter;

an electrical equipment enclosure defining an internal volume, wherein each rechargeable battery, said battery charger, said replaceable fuse, and said inverter are housed therewithin and further comprising:
  a base directly connected to a top surface of a floor of a watercraft by a plurality of L-shaped brackets and configured to accommodate said plurality of rechargeable batteries, said base comprising a plurality of dividers fixedly positioned between said plurality of rechargeable batteries; and
  a lid removably connected to said base, said lid comprising a plurality of terminal clearance features defining an open space sufficient to receive a plurality of battery terminals of said plurality of rechargeable batteries;
  wherein an interface between said base and said lid is waterproof;
an electric motor electrically connected to said inverter to receive said supply AC power, said electric motor comprising a 3-phase 4-pole induction motor having an operating frequency of approximately 400 Hz, a rotational speed of approximately 12,000 RPM and producing approximately 20 kW of power; and
an output drive shaft mechanically connected to said electric motor.

2. The system of claim 1, further comprising a gear reducer mechanically connected to said output shaft to vary a torque and a speed of a propeller connected to said output shaft.

3. The system of claim 1, further comprising a control module electrically interconnected between said inverter and said electric motor to control said delivery of said supply AC power to said electric motor and adjust said rotational speed of said electric motor.

4. The system of claim 3, wherein said control module comprises a variable AC motor control having a user interface configured to regulate said rotational speed of said electric motor.

5. The system of claim 1, wherein said plurality of rechargeable batteries comprises a plurality of rechargeable batteries electrically interconnected in series.

6. The system of claim 1, wherein said plurality of rechargeable batteries comprises a plurality of rechargeable batteries electrically interconnected in parallel.

7. The system of claim 1, wherein said at least one solar panel comprises a plurality of solar panels.

8. A watercraft comprising:
a watercraft frame comprising a floor and a roof;
an electric motor mechanically connected to said watercraft frame, said electric motor comprising a 3-phase 4-pole induction motor having an operating frequency of approximately 400 Hz, a rotational speed of approximately 12,000 RPM and producing approximately 20 kW of power;
an output drive shaft mechanically connected to said electric motor;
a plurality of solar panels coupled to said roof of said watercraft frame and configured to generate a source DC power;
a waterproof electrical equipment enclosure defining an internal volume and comprising:
  a base directly connected to a top surface of said floor of said watercraft by a plurality of L-shaped brackets; and,
  a lid removably connected to said base, wherein an interface between said base and said lid is waterproof;
a plurality of rechargeable batteries housed within said waterproof electrical equipment enclosure, wherein said plurality of rechargeable batteries are configured to store a charging DC power and deliver a supply of approximately 300 volts DC power, wherein said base of said waterproof electrical equipment enclosure is configured to accommodate said plurality of rechargeable batteries and comprises a plurality of dividers fixedly positioned between said plurality of rechargeable batteries, and wherein said lid of said waterproof electrical equipment enclosure comprises a plurality of terminal clearance features defining an open space sufficient to receive a plurality of battery terminals of said plurality of rechargeable batteries;
a DC power output connector electrically connected to said solar panel;
an AC power output connector configured to be electrically connected to an AC electrical utility that supplies a source AC power;
a power input receptacle extending from within said waterproof electrical equipment, wherein said power input receptacle is configured to be mechanically and electrically connected to a selected one of said DC power output connector and said AC power output connector;
a battery charger housed within said waterproof electrical equipment enclosure and electrically interconnected between said power input receptacle and said plurality of rechargeable batteries, wherein said battery charger is configured to receive said source AC power from said AC electrically utility supply and said source DC power from said solar panel, and wherein said battery charger is further configured to automatically switch between said source AC power from said AC electrical utility or said source DC power from said solar panel and deliver said charging DC power to said rechargeable battery;
an inverter housed within said waterproof electrical equipment enclosure and electrically interconnected between said plurality of batteries and said electric motor, wherein said inverter is configured to receive said supply DC power from said plurality of rechargeable batteries and convert said supply DC power to a supply AC power for delivery to said electric motor; and
a replaceable fuse housed within said waterproof electrical equipment enclosure and electrically interconnected between said plurality of rechargeable batteries and said inverter.

9. The system of claim 8, further comprising:
a gear reducer mechanically interconnected between said electric motor and said output shaft; and,
a control module electrically interconnected between said inverter and said electric motor to control said delivery of said supply AC power to said electric motor, wherein said motor control module comprises a variable AC motor control having a user interface configured to regulate said rotational speed of said electric motor.

* * * * *